United States Patent [19]

Nishikawa

[11] Patent Number: 4,918,272
[45] Date of Patent: Apr. 17, 1990

[54] WIPER MOTOR DRIVING DEVICE FOR AUTOMOTIVE VEHICLES

[75] Inventor: Itaru Nishikawa, Tokyo, Japan
[73] Assignee: Nissan Motor Co., Ltd., Yokohama, Japan
[21] Appl. No.: 321,151
[22] Filed: Mar. 9, 1989

Related U.S. Application Data

[63] Continuation-in-part of Ser. No. 94,758, Sep. 10, 1987.

[30] Foreign Application Priority Data

Sep. 11, 1986 [JP] Japan .................. 61-139535

[51] Int. Cl.$^4$ .............................................. H01H 3/40
[52] U.S. Cl. ...................................... 200/501; 200/252
[58] Field of Search ............. 200/501, 571, 252, 63 R, 200/63 A, 19 EL, 24, 28

[56] References Cited

U.S. PATENT DOCUMENTS

| | | | |
|---|---|---|---|
| 435,132 | 8/1890 | Battershall | 200/252 |
| 2,035,505 | 3/1936 | Petersen | 200/42.01 |
| 3,069,670 | 12/1962 | Rondeau | 200/564 X |

FOREIGN PATENT DOCUMENTS 2645799 4/1978 Fed. Rep. of Germany .
G8509394.7 9/1986 Fed. Rep. of Germany .
61-113062 7/1986 Japan .

Primary Examiner—Renee S. Luebke
Attorney, Agent, or Firm—Foley & Lardner, Schwartz, Jeffery, Schwaab, Mack, Blumenthal & Evans

[57] ABSTRACT

In the wiper motor driving device including a motor, a worm driven by the motor, a worm driven by the motor, a worm wheel in mesh with the worm to drive at least one wiper blade, a grounding conductive plate attached to the worm wheel, an autostop conductive plate also attached to the worm wheel, and a pair of conductive spring contacts urged into slidable electrical contact with the grounding and autostop conductive plates to drive and stop a wipe blade along the circumference of the worm wheel, in particular the grounding plate is formed with an arcuate cantilevered end at a height defining space (or with a recess formed in the worm wheel with a depth defining the same space). Therefore, when the worm wheel is reversely rotated due to a reaction force of the wiper blade (e.g. by snow accumulated on the windshield), it is possible to prevent further electrical contact between the grounding plate and the separated contact, that is, to prevent the wiper blade from hunting or chattering operation even in snow weather.

7 Claims, 7 Drawing Sheets

PRIOR ART (LOW DRIVE)

PRIOR ART (DRIVE AFTER OFF)

PRIOR ART (STOP BY SHORT)

WIPER MOTOR DRIVING DEVICE FOR AUTOMOTIVE VEHICLES

RELATED APPLICATION

This application is a continuation-in-part of our prior copending application for U.S. Pat. entitled "WIPER MOTOR DRIVE DEVICE FOR AUTOMOBILE VEHICLE" which was filled by NISHIKAWA on Sept. 10, 1987 and which bears Ser. No. 094,758.

BACKGROUND OF THE INVENTION

1. Field of the Invention

The present invention relates to a wiper motor driving device for automotive vehicles, and more specifically to a wiper motor driving device suitable for use in snowy weather, by which the so-called "wiper blade hunting operation" (the wiper motor is turned on or off by the reaction force of the wiper blade whenever the wiper motor is turned off) can be prevented.

2. Description of the Prior Art

An ordinary wiper motor for automotive vehicles is designed so as not to stop immediately after the wiper switch has been turned off. Instead, the motor continues to rotate until an automatic wiper stop mechanism stops the wiper blade when the blade reaches a horizontal position on the windshield. This is because the wiper blade should not be stopped in the driver's vision. An example of devices as described above is disclosed in Japanese Published, Unexamined (Kokai) Utility Model Application No. 61-113062, for instance, as shown in FIGS. 1(A) and (B).

In these drawings, the automatic wiper motor stop mechanism includes a wiper motor 1, a worm shaft 2 driven by the wiper motor 1, a worm wheel 3 geared with a worm gear formed in the worm shaft 2 so as to form a reduction gear, a roughly circular grounding plate 4 formed with a sectorial cutout portion, and a sectorical autostop plate 5 located at the cutout portion. Grounding plate 4 and autostop plate 5 are concentrically attached to worm wheel 3. In addition, first and second fixed spring contacts 6a and 6b are positioned so that they are selectively brought into contact with grounding plate 4 and the autostop plate 5, respectively. That is, when the worm wheel 3 rotates, the first fixed contact 6a is brought into contact with or separated from both grounding plate 4 and autostop plate 5, while the second fixed contact 6b is brought into contact with or separated from only autostop plate 5, as depicted in FIG. 1(B), With reference to FIGS. 2(A), (B) and (C), the operation of the above automatic wiper blade stop mechanism will be explained hereinbelow.

FIG. 2(A) shows a state in which a wiper switch 7 is at the LOW position. Since a closed circuit is formed from the power supply Acc through the wiper motor 1 to the ground $E_1$, as shown by the arrows, the wiper motor 1 continues to rotate regardless of the positions of the two fixed contacts 6a and 6b (LOW WIPER DRIVE).

Next, if the wiper switch 7 is set to the OFF position, the closed circuit shown by the arrows in FIG. 2(B) is formed. The wiper motor 1 continues to rotate as long as there is a conducting path from the fixed contact 6a through the grounding plate 4, to the ground $E_2$ (DRIVE AFTER OFF).

When the grounding plate 4 reaches the position as shown in FIG. 2(C), the two fixed spring contacts 6a and 6b both come into contact with the autostop plate 5, and at the same time the circuit shown by the arrow is formed. Therefore, an armature shorting (generator control) circuit can be formed to stop the wiper motor 1 momentarily (STOP BY ARMATURE SHORT).

In this configuration, the automatic wiper blade stop mechanism operates in such a way that when the wiper switch 7 is turned off, the wiper motor 1 always stops at a predetermined position or when the wiper blade reaches a specified position on the windshield of a vehicle.

In the above-mentioned prior-art device, there exists a problem in that the hunting or chattering phenomenon occurs, because grounding plate 4 is rotated in the reverse direction by a wiper blade, in particular when snow .is accumulates on the windshield. Once the above hunting operation occurs, other problems occur in that the worm wheel 3 is overheated and therefore its resin part melts, or the electrical circuit develops trouble.

In more detail, in snowy regions, where the considerable amount of snow often accumulates on the windshield, it is impossible for the wiper blade to perfectly clear away the snow on the windshield and therefore snow tends to be put at the lower side of the windshield. Therefore, when the wiper switch 7 is turned off in snowfall, the wiper blade is often pushed back (upward) by a reaction force due to the snow which has accumulated on the lower side of the windshield, so that worm wheel 3 or the grounding plate 4 is rotated in the reverse direction.

As already described, even after wiper switch 7 has been turned off, the wiper blade is kept rotated in the forward direction F (counterclockwise, for instance) to a predetermined lower position as depicted in FIG. 2B. In this case, there exists a state where both the fixed contacts 6a and 6b ar separated away from the grounding plate 4 as shown in FIG. 1(B) and therefore the wiper motor 1 is not driven nor stopped by shorting the armature. However, in ordinary conditions, since the worm wheel 3 is rotated by the inertia, the two fixed contacts 6a and 6b are both smoothly brought into contact with the autostop plate 5 to short the armature of the motor 1 into the state as shown in FIG. 2(C). In snowy weather, however, since the inertia of the worm wheel 3 is absorbed by snow, there exists the state where the two fixed contacts 6a and 6b are separated from both the grounding plate 4 and the autostop plate 5 as shown in FIG. 1(B). Further, when the wiper blade is pushed back (upward) by the snow accumulated on the lower side of the windshield, since the worm wheel 3 or grounding plate 4 is rotated in the reverse direction R (counterclockwise, for instance) in FIG. 1(B), the fixed contact 6a is again brought into contact with the grounding plate 4, so that the grounding plate 4 is again rotated in the forward direction F, thus resulting in the hunting or chattering operation. Since the above operation is continuously repeated, the wiper motor 1 is started and then stopped repeatedly.

To overcome the above-mentioned problems, another prior-art wiper motor driving device as shown in FIG. 3 has been proposed. In this device, a protrusion 8 is formed on the outer surface of worm wheel 3. A rotating contact wheel 10 concentric with the worm wheel 3 is fitted to a gear cover 9 which covers worm wheel 3. Further, a protrusion 11 contactable with the protrusion 8 on worm wheel 3 is provided on the rear surface 10a of the contact wheel 10. An automatic wiper blade stop mechanism (not shown) for wiper motor 1, which is similar to that shown in FIG. 1(A) (including a grounding plate 4, an autostop plate 5, and two fixed contacts 6a and 6b) is arranged on the front surface 10b of the contact wheel 10.

In this prior-art device, when worm wheel 3 rotates in the forward direction F, since the protrusion 8 on the worm wheel 3 is brought into contact with the protrusion 11 on the contact wheel 10 to rotate the contact wheel 10 also in the forward direction, the wiper motor 1 can be started or stopped in the same way as explained with reference to FIG. 1(A). In this device, however, since the contact wheel 10 is driven by the worm wheel 3 via the two protrusions 8 and 11, when the wiper switch 7 is turned off the worm wheel 3 is further rotated in the reverse direction by snow accumulated on the lower side of the windshield, the contact wheel 10, that is, the grounding plate 4 will not be rotated in the reverse direction (because only the protrusion 8 is separated away from the protrusion 11), so that it is possible to prevent occurrence of the hunting operation. In this device, however, many parts such as the gear cover 9, the contact wheel 10, the, two protrusions 8 and 11, etc. are additionally required, thus resulting in other problems because the manufacturing cost and the weight are both increased.

On the other hand, Japanese Published Unexamined (Kokai) Patent Application 61,71253 discloses a wiper intermit operation control system which can prevent the above-mentioned hunting operation. This system comprises a wiper motor, an intermittent signal generating circuit, a first switching element turned on or off to drive the motor in response to the intermittent signals, a motor switching element turned on or off in linkage with the motor, a current holding circuit for driving the motor by a predetermined angle, after the intermittent signals have been turned off, on the basis of the turning-on or -off operation of the first and motor switching elements, a second switching element for turning on or off the current holding circuit, and a flip-flop circuit which is set in response to the intermittent signal to turn on the second switching element and reset in response to the on/off signal from the motor switching element to turn off the second switching element.

The above-mentioned prior-art control system is further complicated in its configuration and high cost.

SUMMARY OF THE INVENTION

With these problems in mind, therefore, it is the primary object of the present invention to provide a wiper motor driving device for automotive vehicles which can prevent the hunting or chattering operation produced in snowy weather particularly, without increasing the cost thereof and in spite of it being a device of simple structure.

To achieve the above-mentioned object, the wiper motor driving device for an automotive vehicle, according to the present invention, comprises: (a) a wiper motor having a worm shaft; (b) a worm wheel having, an autostop plate and a grounding plate which are disposed adjacent to each other on a surface of said worm wheel for conducting an electric current, said worm wheel meshing with the worm shaft for rotation, said grounding plate having a cantilevered end at a height defining a space between the cantilevered end and a portion of the worm wheel; and (c) electrical contact means having a fixed contact movable in a slidable electrical contact relationship with said autostop plate and grounding plate to control the electric current, so that the worm wheel and the wiper blade stop at a specified angular position of said worm wheel, said contact being separated from said grounding plate at said cantilevered end upon rotation of said worm wheel, said separated contact being of a height less than the cantilevered end of the grounding plate, whereby the worm wheel may be reversely rotated due to a reaction force of the wiper blade without further electrical contact between the grounding plate and the separated contact.

The height between the cantilevered end of said grounding plate and the worm wheel is formed by sloping the cantilevered end away from the worm wheel in a circular arc fashion or defined by a recess formed in the worm wheel.

In the wiper motor driving device according to the present invention, when the wiper switch is turned off, the spring contact elastically urged into slidable electrical contact with the grounding plate fixed to the worm wheel is separated away from the grounding plate at the cantilevered end. At this moment, since the spring contact is located within the space or the recess formed between the cantilevered end of the grounding conductive plate and the worm wheel, even if the worm wheel is reversely rotated due to a reaction force (caused by snow) of the wiper blade, it is possible to prevent the spring contact from being brought into contact again with the grounding plate, that is to prevent the hunting or chattering operation of the wiper blade driving device.

DETAILED DESCRIPTION OF THE PREFERRED EMBODIMENTS

Figure 1A:
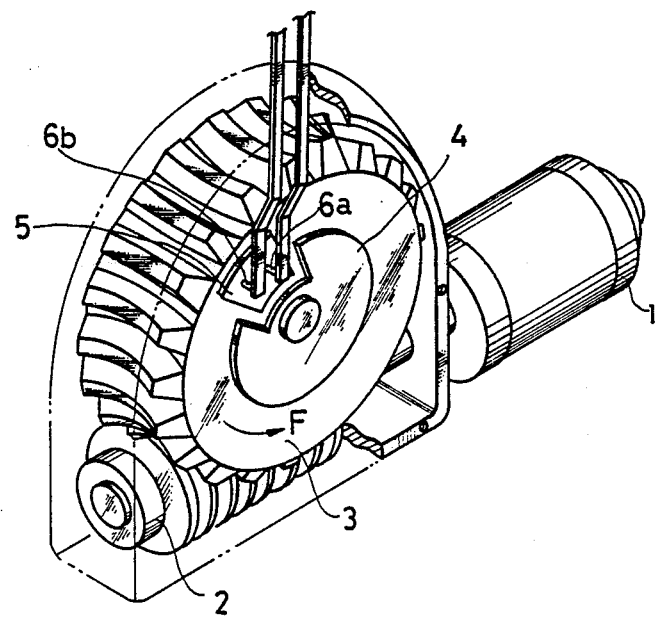
FIG. 1(A) is a perspective view showing a first example of prior-art wiper motor driving devices.
Figure 1B:
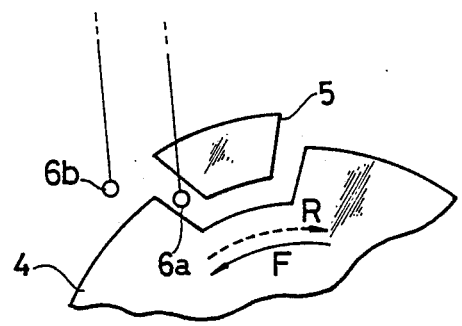
FIG. 1(B) is an enlarged fragmentary view for assistance in explaining hunting or chattering operation of the driving device.
Figure 4A:
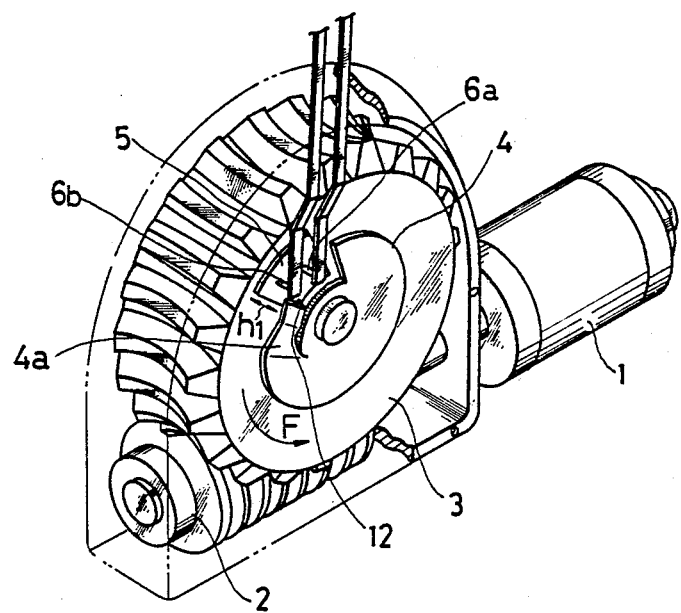
FIG. 4 (A) is a perspective view showing a first embodiment of the wiper blade driving device according to the present invention.
FIG. 4(B) is an enlarged partial view for assistance in explaining a space with a height $h_1$ formed between the grounding plate and the worm wheel.

With reference to FIG. 4(A), a first embodiment of a wiper motor driving device for automotive vehicles according to the present invention will be described hereinbelow. The device comprises a wiper motor 1, a worm shaft 2 formed with a worm and driven by the worm shaft 2, a worm wheel. 3 meshing with the worm formed in the worm shaft 2, a grounding conductive plate 4 formed with a sectorial cutout portion and fixed to the worm wheel 3, an autostop sectorial conductive plate 5 also fixed to the worm wheel 3 at the sectorial cutout portion of the worm wheel 3, and a pair of first and second conductive spring contacts 6a and 6b. As already explained with reference to FIGS. 1(B), 2(A), (B) and (C), the first conductive spring contact 6a is so located as to be brought into contact with both the conductive (grounding and autostop) plates 4 and 5, and the second conductive spring contact 6b is so located as to be brought into contact with only the autostop conductive plate 5.

In this embodiment, the grounding conductive plate 4 is attached to the worm wheel so as to cover a major circumference of the worm wheel. As depicted in FIGS. 4 (A) and (B), the grounding plate 4 is formed with a slope surface 4a having an arcuate cantilevered end 12 with a height $h_1$ defining an open space between the cantilevered end 12 and a portion of worm wheel 3.

The first spring contact 6a is movable in a slidable electrical contact relationship with the autostop plate 5 and the grounding plate 4 to control the electric current, so that worm wheel 3 and the wiper blade can stop at a specified angular position of the worm wheel.

In the above-mentioned configuration once the spring contact 6a is separated from the cantilevered end 12 of grounding plate 4, even if the grounding plate 4 fixed to worm wheel 3 is reversely rotated due to a reaction force of the wiper blade (generated by snow accumulated on the lower portion of the windshield), the separated contact 6a of a height less than that $h_1$ formed between the cantilevered end 12 of the grounding plate 4 and the portion of worm wheel 3 is kept separated away from the grounding plate 4 without further electrical contact between the grounding plate 4 and the first separated spring contact 6a, because spring contact 6a goes under the grounding plate 4.

Therefore, it is possible to prevent the aforementioned hunting or chattering operation involved in the prior art device.

Figure 5A:
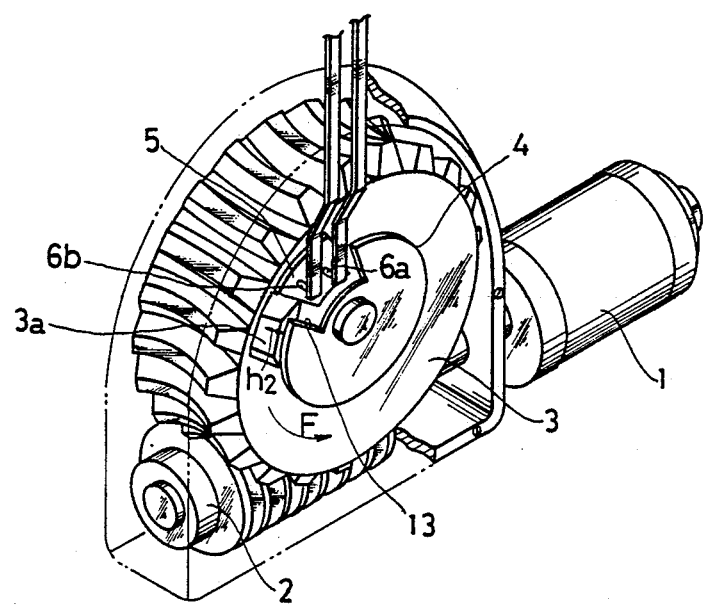
FIG. 5(A) is a perspective view showing a second embodiment of the wiper blade driving device according to the present invention.

FIGS. 5(A) and (B) show a second embodiment of the device according to the present invention, in which a recess with a depth $h_2$ is formed between the cantilevered (cutout) end 13 of the grounding plate 4 and a bottom portion 3a of worm wheel 3. In this second embodiment, the separated contact 6a of a height less than the depth $h_2$ formed between the cantilevered end 13 of the grounding plate 4 and the recessed portion 3a of worm wheel 3 is kept separated way from the grounding plate 4 without further electrical contact between the grounding plate 4 and the first separated spring contact 6a.

Figure 2A:
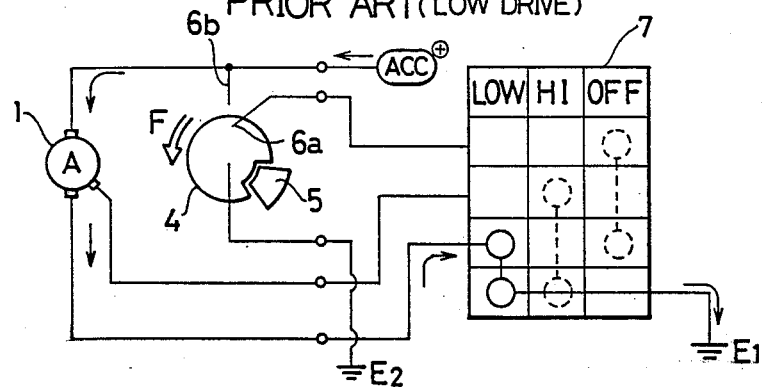
FIGS. 2(A), (B) and (C) are schematic diagrams for assistance in explaining the automatic wiper blade stop operation of the driving device.

The operation of the driving device shown in FIGS. 4(A) and (B) will be described in further detail with reference to FIGS. 6(A), (B), (C) and (D) and FIGS. 2(A), (B) and (C) in combination.

Figure 2B:
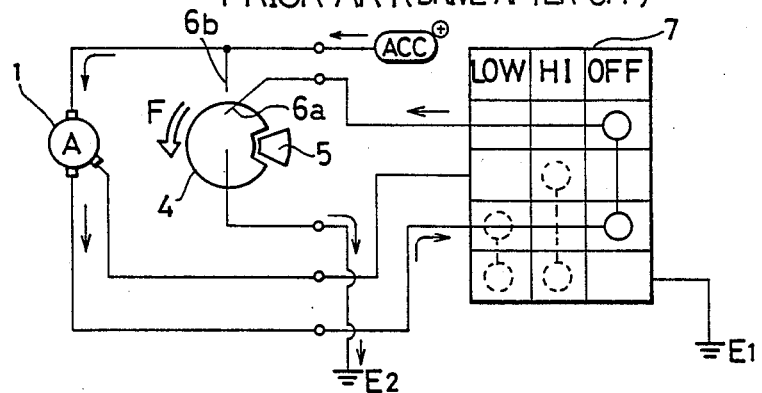
Figure 4B:
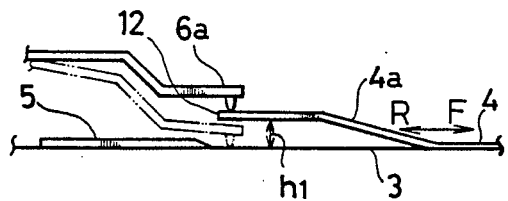
Figure 6A:
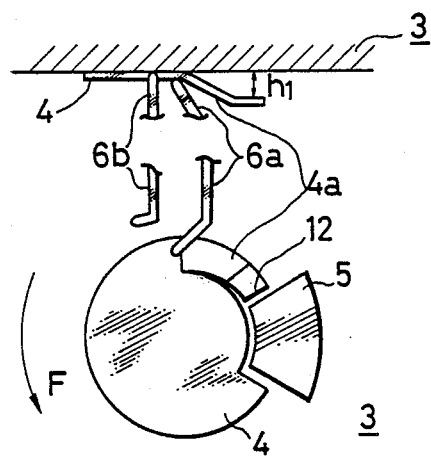
FIGS. 6(A), (B), (C) and (D) are series of illustrations for assistance in explaining the slidable contact relationship between the two spring contacts and the grounding and autostop conductive plates of the driving device shown in FIGS. 4(A) and (B).

(1) Wiper switch is turned off but blade is moved to a predetermined position (See FIGS. 2(B) and 6(A)): Since the grounding plate 4 is formed with a slope surface 4a as shown in FIG. 4(B), a space with a height $h_1$ is formed under the arcuate cantilevered end 12 of the grounding plate 4.

Under these conditions, when the wiper switch is turned off, since the contact 6a is still in contact with the grounding plate 4, the motor 1 is kept rotated to rotate the plate 4 in the forward (counterclockwise) direction F. Therefore, the spring contact 6a rises along the slope surface 4a and falls down from the cantilevered end 12, being separated from the grounding plate 4 by the motor inertia.

Figure 2C:
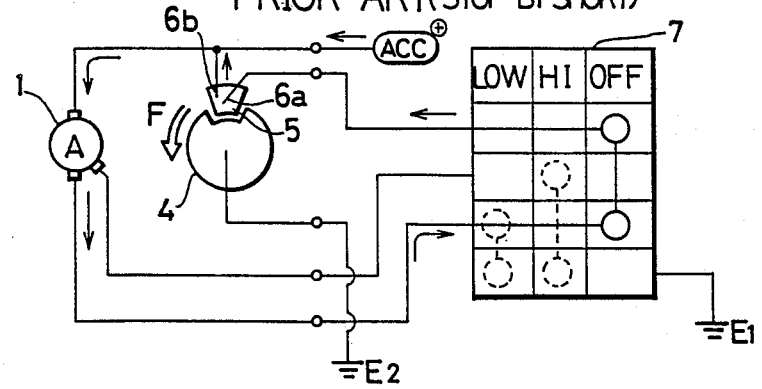
Figure 3:
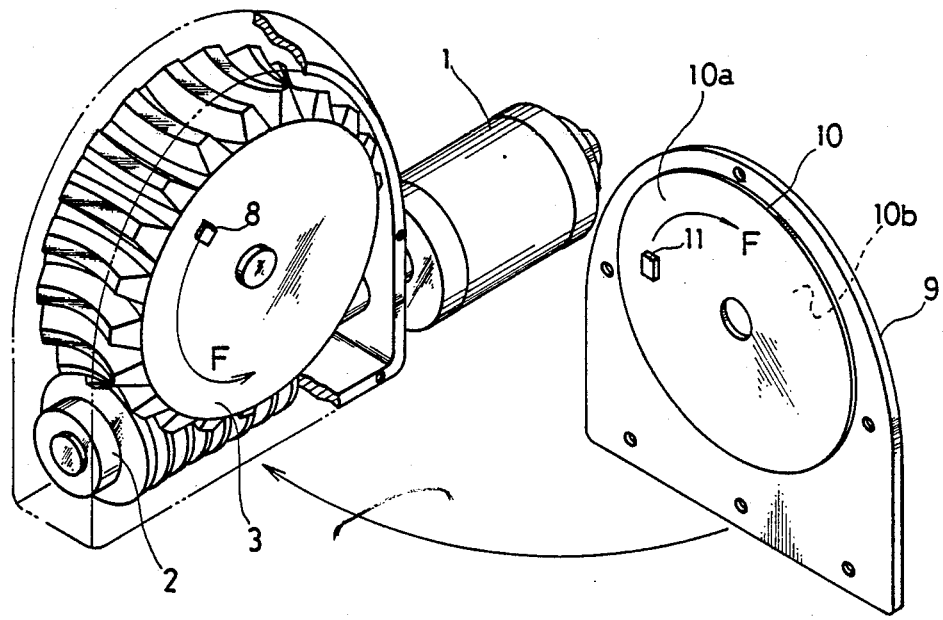
FIG. 3 is a perspective view showing a second example of prior-art wiper motor driving devices.
Figure 6B:
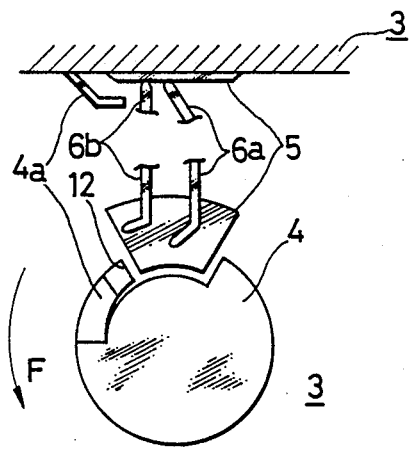
Figure 6C:
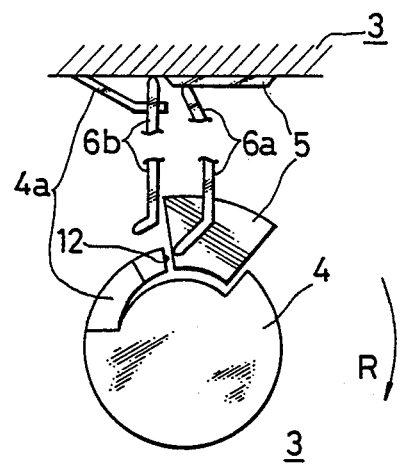

(2) Blade stops instantaneously by shorting armature (See FIGS. 2(C), 6(B) and 6(C)):

The two contacts 6a and 6b are brought into contact with the autostop plate 5 by the motor inertia. Since the wiper motor armature is shorted, the motor stops instantaneously. Under these conditions, although no wiper motor power is transmitted to the grounding plate 4, the plate 4 is forcedly rotated in the reverse (clockwise) direction R by a reaction force of the wiper blade due to snow accumulated on the lower side of windshield. Under these conditions, when the amount of snow on the windshield is small, only the contact 6b is separated away from the grounding plate 5 as shown in FIG. 6(C). However, contact 6a is still in contact with plate 5 or located in a gap formed between the two conductive plates 4 and 5 without shorting the wiper motor armature. Here, FIG. 6(C) shows a state between those shown in FIGS. 2(A) and 2(B).

Figure 6D:
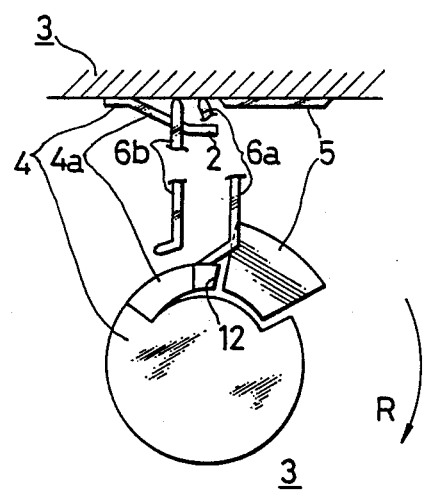

(3) The blade is prevented from chattering (See FIG. 6(D)).

When the amount of snow increases, since the reaction force is further increased, the grounding plate 4 is further rotated in the reverse direction R. Under these conditions, the two contacts 6a and 6b are both separated away from the autostop plate 5. In the prior-art device, since the contact 6a is again brought into contact with grounding plate 4, plates 4 and 5 rotate again in the forward direction F as shown in FIG. 6(A), so that the hunting or chattering operation occurs.

In the present invention, however, since the grounding plate 4 is formed with an arcuate sloped surface 4a and an arcuate cantilevered end 12 so as to provide a space or a step portion with a height $h_1$ under the cantilevered end (2), the contact 6a goes into holder the cantilevered end 12 and further along the sloped surface 4a without contact or interference with the grounding plate 4. Therefore, it is possible to keep the contact 6a separated away from grounding plate 4 even if worm wheel 3 is rotated in the reverse direction by snow, so that the wiper is kept stopped without repeating the start/stop hunting operation as in the prior-art device.

Figure 5B:
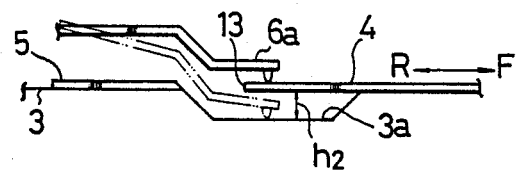
FIG. 5(B) is an enlarged partial view for assistance in explaining a recess with a depth $h_2$ formed between the grounding plate and the worm wheel.

Further, where a recessed portion 3a with a depth $h_2$ is formed on the surface of worm wheel 3 made of resin as shown in FIG. 5(B), since a space with a height or depth $h_2$ can be formed between the grounding plate 4 and worm wheel 3, it is also possible to obtain the same effect as in the first embodiment, as depicted in FIG. 5(B).

As described above, in the wiper blade driving device according to the present invention, after the first fixed spring contact 6a in spring-biased sliding contact with the grounding plate 4 has been separated away from the arcuate cantilevered end 12 or 13 of the grounding plate 4, the fixed contact 6a falls into the open space with a height $h_1$ or a recess with a depth $h_2$ formed between the grounding plate 4 and the worm wheel 3. Therefore, even if the worm wheel 3 is rotated in the reverse direction due to a reaction force of the wiper blade caused by snow accumulated on the windshield after the wiper motor 1 has been stopped, the fixed contact 6a is kept away from the grounding plate 4, thus preventing the hunting or chattering operation. Further, since the structure of the device of the present invention is very simple, it is possible to obtain the above-mentioned effect without increasing the number of parts or elements and therefore without increasing the manufacturing cost.

What is claimed is:

1. A wiper motor driving device for an automotive vehicle, comprising:
    (a) a wiper motor having a worm shaft;
    (b) a worm wheel having an autostop plate and a grounding plate which are disposed adjacent to each other on a surface of said worm wheel for conducting an electric current, said worm wheel meshing with worm shaft for rotation, said grounding plate having a cantilevered end at a height defining a space between the cantilevered end and a portion of worm wheel; and
    (c) electrical contact means having a fixed contact movable in a slidable electrical contact relationship with said autostop plate and grounding plate to control the electric current, so that worm wheel and the wiper blade stop at a specified angular position of said worm wheel, said contact being separated from said grounding plate at said cantilevered end upon rotation of said worm wheel, said separated contact being of a height less than the cantilevered end of the grounding plate, whereby the worm wheel may be reversely rotated due to a reaction force of the wiper blade without further electrical contact between the grounding plate and the separated contact.

2. The wiper motor driving device of claim 1, wherein the height between the cantilevered end of said grounding plate and worm wheel is formed by sloping the cantilevered end away from worm wheel in circular arc fashion.

3. The wiper motor driving device of claim 1, wherein the height between the cantilevered end of said grounding plate and worm wheel is defined by a recess formed in the worm wheel.

4. A wiper blade driving device for an automotive vehicle, comprising:
    (a) a motor;
    (b) a worm driven by said motor;
    (c) a worm wheel in mesh with said worm to drive at least one wiper blade;
    (d) a grounding conductive plate attached to said worm wheel, said grounding plate having a cantilevered end at a height defining a space between the cantilevered end and a portion of the worm wheel;
    (e) an autostop conductive plate also attached to said worm wheel; and
    (f) a pair of conductive spring contacts elastically urged into slidable electrical contact with said grounding and autostop conductive plates to drive and stop a wiper blade according to a rotative motion of said worm wheel, one of said contacts being separated from said grounding plate at said cantilevered end upon rotation of said worm wheel, said separated contact being of a height less than the cantilevered end of the grounding plate, whereby the worm wheel may be reversely rotated due to a reaction force of the wiper blade without further electrical contact between the grounding plate and the separated contact.

5. A wiper blade driving device for an automotive vehicle, comprising:
    (a) a motor;
    (b) a worm driven by said motor;
    (c) a worm wheel in mesh with said worm;
    (d) an autostop conductive plate attached to said worm wheel so as to cover a minor sectorial area on said worm wheel;
    (e) a grounding conductive plate also attached to said worm wheel so as to cover a major sectorial area on said worm wheel, said grounding plate having a cantilevered end at a height defining an open space between the cantilevered end and a portion of worm wheel; and
    (f) a pair of conductive spring contacts elastically urged into slidable electrical contact with said grounding and autostop conductive plates to drive and stop a wiper blade according to a rotative motion of said worm wheel, one of said conductive spring contacts being separated from said grounding conductive plate at said cantilevered end upon rotation of worm wheel, said separated conductive spring contact being of a height less than the cantilevered end of the grounding plate, whereby worm wheel may be reversely rotated due to a reaction force of the wiper blade without further electrical contact between the grounding plate and the separated contact.

6. The wiper blade driving device of claim 5, wherein the height between the cantilevered end of said grounding conductive plate and worm wheel is defined by sloping the cantilevered end away from worm wheel in circular arc fashion.

7. The wiper blade driving device of claim 5, wherein the height between the cantilevered end of said grounding conductive plate and worm wheel is defined by a recess formed in worm wheel.

* * * * *